United States Patent [19]

Westerfield

[11] Patent Number: 4,622,557

[45] Date of Patent: Nov. 11, 1986

[54] TRANSDIGITIZER FOR RELAYING SIGNALS FROM GLOBAL POSITIONING SYSTEM (GPS) SATELLITES

[75] Inventor: Edwin E. Westerfield, Silver Spring, Md.

[73] Assignee: The United States of America as represented by the Secretary of the Air Force, Washington, D.C.

[21] Appl. No.: 666,784

[22] Filed: Oct. 31, 1984

[51] Int. Cl.[4] .......................................... H04B 7/185
[52] U.S. Cl. ..................................... 342/357; 342/42
[58] Field of Search ................. 343/6, 6.5 R, 6.5 LC, 343/6.5 SS, 6.8 R, 6.8 LC, 357, 386; 367/3–6; 455/11–12; 375/67

[56] References Cited

U.S. PATENT DOCUMENTS

| | | |
|---|---|---|
| 3,126,545 | 3/1964 | Smith, Jr. .......................... 343/385 |
| 3,241,137 | 3/1966 | Smoll .............................. 343/6.8 R |
| 3,378,837 | 4/1968 | Graves ............................. 343/7.5 |
| 3,384,891 | 5/1968 | Anderson ......................... 343/6.5 R |
| 4,013,960 | 3/1977 | Godet .............................. 375/67 |
| 4,218,680 | 8/1980 | Kennedy .......................... 343/6.8 R |
| 4,386,355 | 5/1983 | Drew et al. ....................... 343/357 |
| 4,445,118 | 4/1984 | Taylor et al. ..................... 343/357 |

FOREIGN PATENT DOCUMENTS 0006691  1/1980  European Pat. Off. ......... 343/6.5 R

OTHER PUBLICATIONS

M. Skolnik, Radar Handbook (McGraw-Hill, 1970) pp. 38-11 through 38-13.
"Platform Loc. and Data Coll. by Satt. Systems," P. Sitbon, IEEE Trans. on Geoscience Electronics (vol. GE-13, No. 1, 1/75, pp. 2-17.
"Surface Impact Location System", A. Caron, *Proc. of Ocean '72 Conf.* (9/72) pp. 462-467.

Primary Examiner—Theodore M. Blum
Assistant Examiner—Bernarr Earl Gregory
Attorney, Agent, or Firm—Donald J. Singer; William G. Auton

[57] ABSTRACT

The reception, downconversion and retransmission of the 1575.42 MHz Global Positioning System (GPS) satellite signal is accomplished by the following. First, an RF stage comprising of an antenna, filter and preamplifier receiver, filters and amplifies the 1575.42 MHz signals. Following the RF stage, a converter stage, consisting of a bandpass filter, converts the GPS signal to a lower frequency. Then, an Intermediate Frequency (IF), comprising an IF amplifier, multiplier, bandpass filter and limiter further amplifies and filters the signals to remove the effects of the signals. A final downconverter converts the signal to a base band frequency and in a zero crossing detector the signal is amplified and 1 bit quantized. Finally, a local oscillator controls a frequency synthesizer to latch the signal from the zero crossing detector in a flip flop, which in turn is used to control a quadraphase monitor, whose signals are amplified and transmitted out the transmit antenna.

6 Claims, 6 Drawing Figures

TRANSDIGITIZER FOR RELAYING SIGNALS FROM GLOBAL POSITIONING SYSTEM (GPS) SATELLITES

STATEMENT OF GOVERNMENT INTEREST

The invention described herein may be manufactured and used by or for the Government for governmental purposes without the payment of any royalty thereon

BACKGROUND OF THE INVENTION

The present invention relates generally to navigational systems and more specifically to a transdigitizer as used in a sonobuoy relay for relaying signals from U.S. Air Force Global Positioning System (GPS) satellites.

The Soviet Union uses operational launch control centers to test launch their inter continental ballistic missile systems (ICBM's). The United States test launches its ICBM's from Vandenberg AFB, Calif. where missiles are launched into the South Pacific near the Kwajalein Missile Range or one of several broad ocean area (BOA) target areas. Although the missiles have their own internal navigation systems, one of the purposes of the test launches is to determine the accuracy of the missile systems.

Therefore, testing of ballistic missile systems requires that the splash point of reentry bodies be accurately determined. This determination is usually made through use of the Sonobuoy Missile Impact Location system (SMILS). With this system up to 15 sonobuoys are dropped in an array in the target area. Each buoy has the ability of detecting acoustic (in water) noise generated by the splash of the reentry body and of transmitting the reentry data to an aircraft circling overhead. It is essential that the geodetic position of each sonobuoy be known. The system is used for determining the position of the buoys through use of the signals from the GPS satellites.

The buoys are dropped by the mission support aircraft. As the buoy falls free from the aircraft a small drag parachute deploys which stabilizes the decent of the buoy into the water. At the time of impact with the water the parachute is released, and an antenna is erected. In some buoy types the antenna is located in a small balloon (float) assembly which is inflated by gas from a pressure bottle. The balloon serves to provide extra flotation for the buoy as well as protection for the antenna from salt spray. When the antenna is deployed, the buoy releases a hydrophone assembly which descends to a specified depth. In the case of buoys that are used with this system the typical depth is 30 feet. The hydrophone picks up acoustic energy from the water and transmits this data to the aircraft circling overhead via a VHF radio link. Many buoy types also have the capability of generating acoustic pings (pulses).

Several different types of buoys are used in the GPS SMILS system. The velocimeter buoy is used to measure the velocity of sound in water. A bathythermograph buoy may also be deployed to measure water temperature as a function of depth.

Three of the buoys in the array are known as GPS transdigitizer buoys (GTD). These buoys, developed by the Applied Physics Laboratory of the Johns Hopkins University, receive signals from the GPS satellites in view and translate them down to base band where they are one-bit quantized and sampled at a 2 megasample/sec rate. These data along with a data stream generated by digitizing the acoustic data are then used to modulate a carrier for transmission to an aircraft that is circling overhead. The GTD buoy is also equipped with a command receiver for turning the transdigitizer power off and on and for commanding acoustic pings.

In addition to the three GTD buoys and velocimeter buoy, additional buoys are used in the array that are similar to the standard ASW (Anti-Submarine Warfare) buoy. These buoys receive acoustic data, relay it to the supporting aircraft, and also generate acoustic pings. The availability of more than three buoys reduces the possibility of signals being missed because of a particular buoy receiving simultaneous signals from more than one reentry body splash. A large number of buoys also provides improved geometry which results in improved accuracy in the determination of the splash position.

The primary function of the GTD buoys is to provide the position and orientation of the buoy array. As described previously, signals received at the buoy from satellites in view are digitized and transmitted to the supporting aircraft. The data are both used in real time and recorded for post-test analysis in the support aircraft. Special Digital Tracker Channels (DTC) track the signals from each of the satellites received by each buoy. The output of these tracker channels are pseudoranges and pseudorange rates. By processing thes measurements from three of four satellites (limited by the availability of DTC) the position of the GTD buoys in the water is accurately determined.

To determine the position of the other buoys the acoustic pings generated by each of the buoys are received by the other buoys, and are transmitted to the aircraft. These data are processed in the aircraft to provide the ranges between the buoys, which determine the relative position of the buoys. Because the positions of the GTD buoys are known, the geodetic position of each of the buoys can then be determined.

When a reentry body strikes the water it will create a large sonic pulse. The time of receipt of this pulse at each of the buoys can be accurately measured. This information is then used to determine the position of the actual splashes.

In view of the foregoing discussion, it is apparent that the testing of ballistic missiles requires not only instrumentation to determine the position of the missile as a function of time during the missile flight but also a means for determining the impact point of each reentry body. The present invention uses signals from the Air Force's Global Positioning System (GPS) satellites to determine the geodetic position of each sonabuoy which, in turn, permits the generation of test data which will accurately determine the location of the impact points of each reentry body.

SUMMARY OF THE INVENTION

The present invention is a transdigitizer for relaying signals from Global Position System (GPS) satellites for determining the exact position of a sonobuoy. The sonobuoy relay receives a high frequency signal from a satellite and down converts it and then retransmits it to an aircraft or a ground station.

The reception, down conversion and retransmission of the 1575.42 $MH_z$ GPS satellite signals is accomplished by the following: First, an RF stage comprising of an antenna, filter and pre amplifier receives, filters and amplifies the 1575.42 $MH_z$ signals.

Following the RF stage, a converter stage, consisting of a band pass filter, converts the GPS signals to a lower frequency. Then, an Intermediate Frequency(IF) stage, comprising an IF amplifier, multiplier, band pass filter and limiter further amplifies and filters the signals to remove the effects of other signals.

A final downconverter converts the signal to a base band frequency and in a zero crossing detector the signal is amplified and one bit quantized.

Next, a local master oscillator controls a frequency synthesizer to latch the signal from the zero crossing detector in a flip flop, which in turn is used to control a quadraphase modulator, whose signals are amplified and transmitted out the transmit antenna.

It is a principal object of the present invention to provide a sonobuoy relay which permits the use of signals from the Global Positioning System satellite to determine the position of sonobuoys in a buoy array and therefrom an accurate determination of the splash point of nearby bodies.

It is another object of the present invention to receive, downconvert and retransmit signals from Global Positioning System satellites.

It is another object of the present invention to support an improved satellite navigation system It is another object of the present invention to enhance the current testing abilities in test launches of intercontinental ballistic missile systems.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a transdigitizer for relaying signals from Global Positioning System (GPS) satellites for determining the exact position of a sonobuoy.

Figure 1:
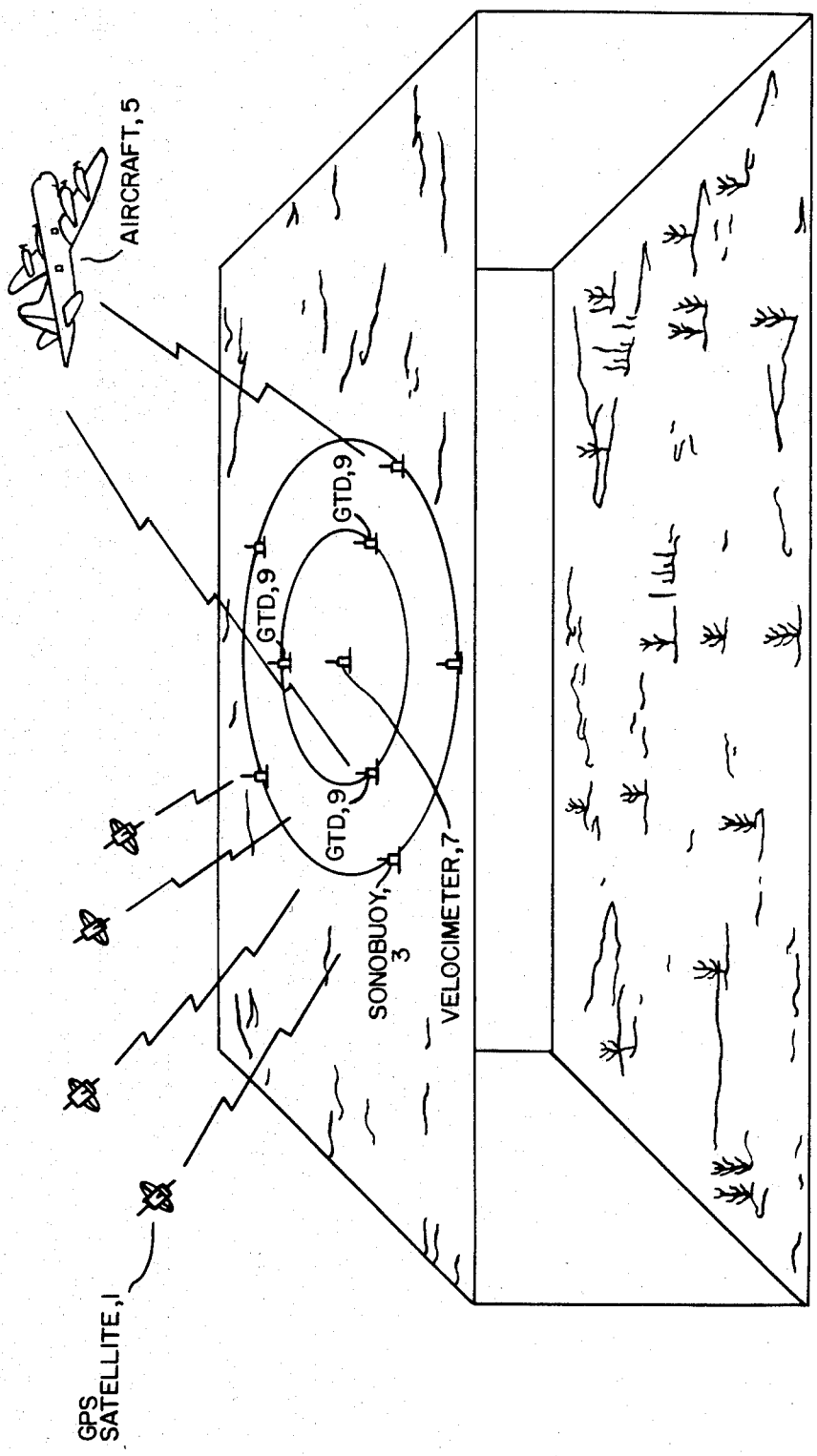
FIG. 1 is a sketch depicting the use of an array of sonobuoys.

FIG. 1 is a sketch of the current use of an array of sonobuoys in the testing of a ballistic missile system through use of a Sonobuoy Missile Impact Location System (SMILS). With this system up to 15 sonobuoys 3 are dropped in an array in the target area. Each buoy uses the ability of detecting acoustic (in water) noise generated by the splash of the reentry buoy and of transmitting the reentry data to an aircraft 5 circling overhead.

Several different types of buoys are used in the system shown in FIG. 1. The velocimeter buoy 7 is used to measure the velocity of sound in water. A bathythermograph buoy may also be deployed to measure water temperature as a function of depth.

Three of the buoys in the array are known as GPS transdigitizer buoys (GTD)9. These buoys contain the present invention, a relay that receives signals from GPS satellites 1 in view and translates them down to base band where they are one-bit quantized and sampled at a 2 megasample/sec rate. These data along with a data stream generated by digitizing the acoustic data are then used to modulate a carrier for transmission to the aircraft 5 that is circling overhead. The GTD buoy is also equipped with a command receiver for turning the transdigitizer power off and on and for commanding acoustic pings.

In addition to the three GTD buoys 9 and velocimeter buoy 7, additional buoys 3 are used in the array that are similar to the standard ASW (Anti-Submarine Warfare) buoy. These buoys 3 receive acoustic data, relay it to the supporting aircraft, and also generate acoustic pings. The availability of more than three buoys reduces the possibility of signals being missed because of a particular buoy receiving simultaneous signals from more than one reentry body splash.

Figure 2:
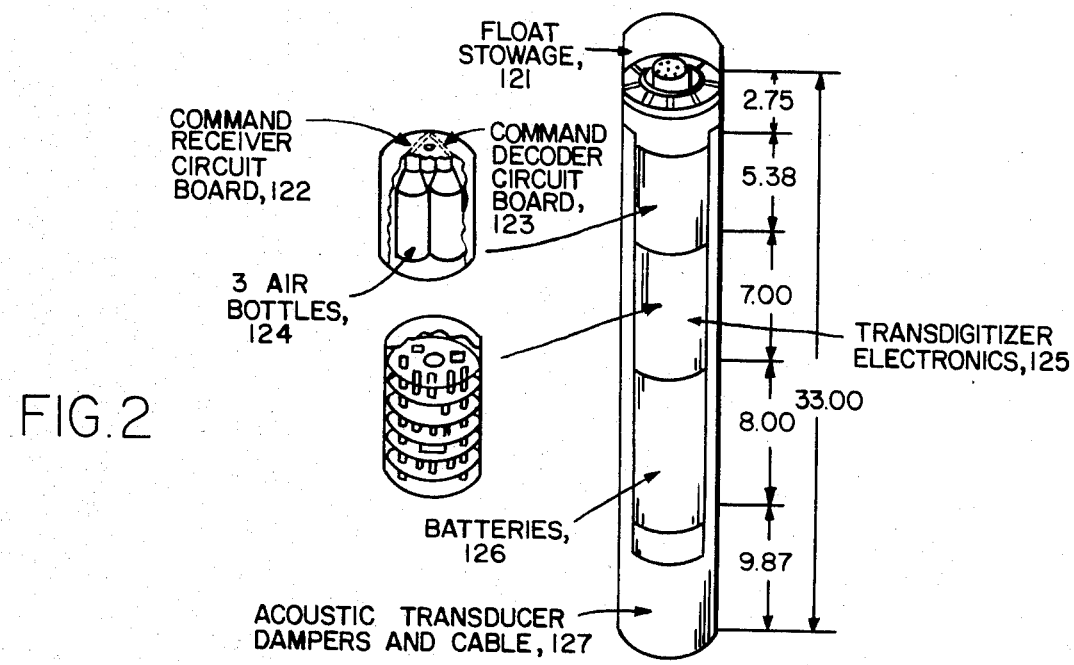
FIG. 2 shows a cutaway view of a buoy.

FIG. 2 shows a cutaway view of the CTD buoy. At the top of the assembly 121 is room for storage of the float bag (balloon) and antennas. The antenna system must provide for receipt of signals at 1575.42 MH from the GPS satellites, receipt of command signals from the aircraft, and transmission of rhe data to the aircraft. The antenna system comprises a backfire helix antenna with a monopole antenna in the center. When the float is inflated by release of gas from the air bottles, shown underneath the float storage aeram the antenna, system is automatically erected because the top of the helix is secured to the top of the float.

Underneath the float storage area is a group of boards that contain the electronics for the transdigitizer 125 including the transmitter and the command receiver 122. A board containing circuitry for processing the acoustic data received from the hydrophone is also in the stack. Below the electronics is a compartment housing the batteries 126. Operational buoys will probably use lithium batteries but nickle-cadmium or sealed lead-acid batteries are used in test buoys for safety reasons.

At the bottom of the buoy is a chamber housing the acoustic transducer, a damper, and the cable 127. The damper is a device made from plastic that will expand once it is released to form a disk in the water tethered a short distance above the hydrophone. Part of the cable connecting the buoy to the damper consists of an elastic cable that can be readily stretched. The function of the damper and this cable is to keep the hydrophone stationary while the buoy rides up and down on the ocean swells. This is necessary to reduce the water noise that would occur if the transducer was riding up and down in the water following the vertical motion of the buoy.

Finally, FIG. 2 depicts the dimensions of the GTD buoy in inches. The typical sonobuoy is 4.5 inches in diameter and approximately 33 inches in height.

Figure 3:
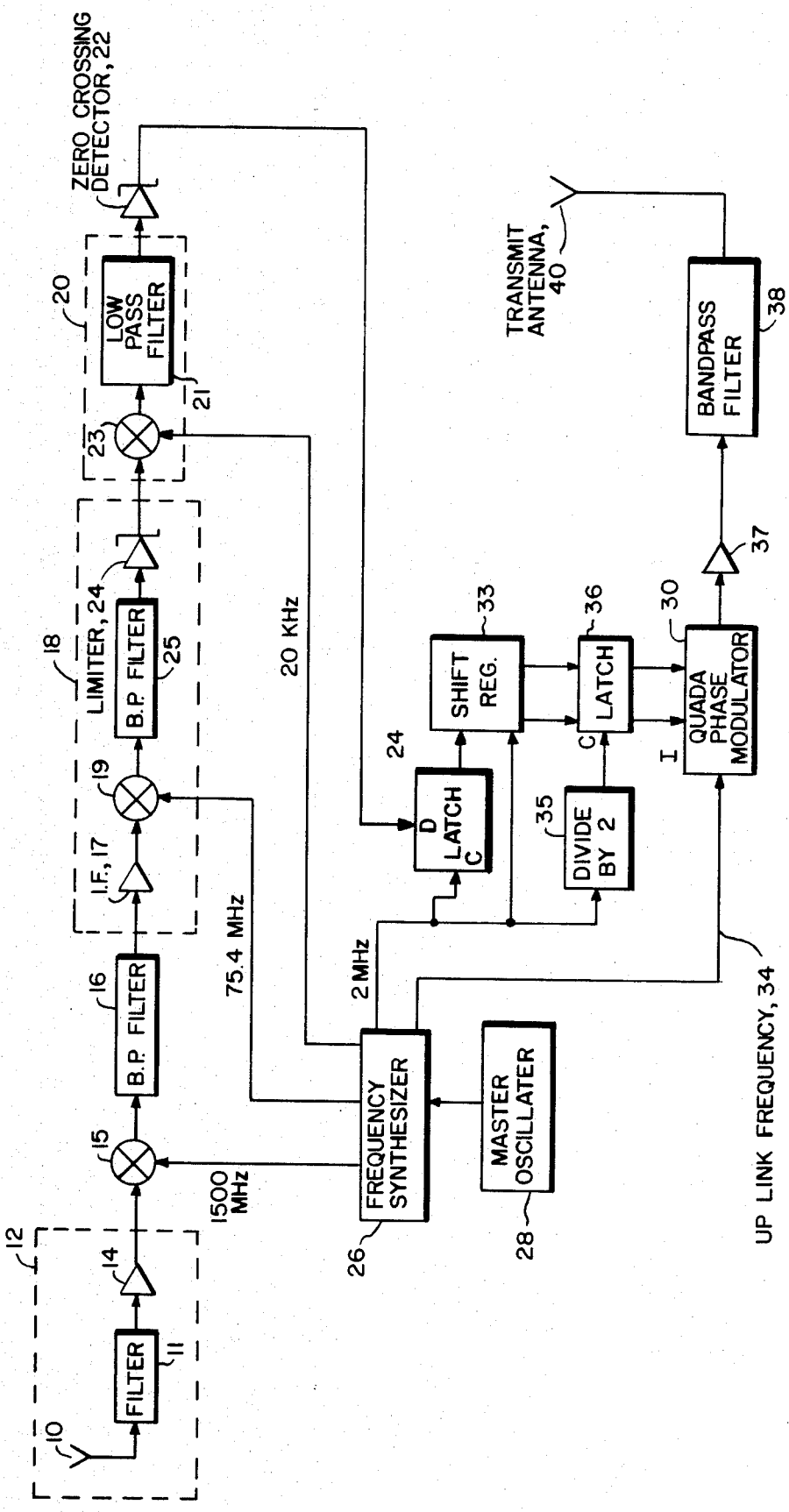
FIG. 3 is a block diagram of the preferred embodiment of the invention.

FIG. 3 is a block diagram of the preferred embodiment of the invention, the transdigitizer component of the GTD buoy. As mentioned earlier, the primary function of the GTD buoys is to provide the position and orientation of the buoy array. As described previously, signals received at the buoy from satellites in view are digitized and transmitted to the supporting aircraft. The data are both used in real time and recorded for post-test analysis in the support aircraft. Special Digital Tracker Channels (DTC) track the signals from each of the satellites received by each buoy. The output of these tracker channels are pseudoranges and pseudorange rates. By processing these measurements from three or four satellites (limited by the availability of DTC) the position of the GTD buoys in the water is accurately determined.

The transdigitizer shown in FIG. 3 contains the RF stage 12 where the signals received from the GPS satellites by the receive antenna 10 at a frequency of 1575.42 MHz are filtered by the filter 11, then amplified by a preamp 14 which has a 24 DB gain. A converter stage 10 containing a bandpass filter 16 then converts the signals to a lower frequency of 75.42 MHz. IF stage 18 containing an amplifier 17, mixer 19, band pass filter 25 and limiter 24 further amplifies filters and heterodynes the signals to remove the effect of other frequency signals. A final down converter stage 20 containing a mixer 23 and a low pass filter 21 converts the signal to a base band frequency.

In the down converter stage 20, the signal is further amplified and heterodyned down to a frequency of 20 KHz. In this process a fold-over of the signal occurs. This signal is passed through a 1 MHz low pass filter 21 and thence to a zero crossing detector 22 which provides a transistor-transistor logic (TTL) digital output.

At "zero crossing" detector 22, following amplification, the signals are 1 bit quantized, i.e., a digital logic 1 generated if the signal is positive with respect to ground or a logic 0 if it is negative with respect to ground. The signals are latched in a flip-flop 24 by a frequency synthesizer 26 controlled by local master oscillator 28. In this manner, the signal is sampled through the use of a flip-flop that is clocked by a signal. This digital signal is then fed into one input of a quadraphase modulator 30 with the shift register 33, latch 36 and divide by two 35, used to control phase modulator 30. An RF carrier 34 is modulated thereby for transmission via antenna 40 to either an aircraft or a ground facility.

All local oscillator signals required for the heterodyning process are generated in a frequency synthesizer assembly 46 from a master crystal oscillator 28. Phase lock loop techniques are utilized for generating all of the high frequency signals. In the case of the 1500 MHz signal required by the first mixer 15, a voltage tunable oscillator is used to generate the 1500 MHz frequency. This signal is then divided down using digital logic to a 500 kHz comparison frequency.

This signal is compared to a 500 kHz frequency generated by dividing down the 4 MHz master oscillator signal. Any difference in frequency or phase generates a control signal that corrects the frequency of the 1500 MHz oscillator. Essentially the same technique has been used to generate all the local oscillator frequencies. This method has been found to work reliably, while requiring a minimum of parts and little tuning following assembly. For example, only four integrated circuit chips are required for the 1500 MHz local oscillator.

Another input to the quadraphase modulator 30 is an asynchronous digital data stream generated by processing the acoustic data received by the hydrophone. The signal from the modulator 30 is then amplified by amplifier 37 and filtered by the bandpass filter 38 to provide an RF output power of 2W to the transmit antenna 40.

In the preferred embodiment of the transdigitizer shown in FIG. 3, the antenna 10 of the RF stage 12 comprises a backfire helix antenna with a monpopole antenna in the center designed for receipt of signals at 1575.31 MHz. The filter 11 of the RF stage is a bandpass filter with a center frequency of 1575.42 MHz, a bandwidth of 150 MHz and a 5 DB gain. The preamplifier 14 in the RF stage is a two-stage amplifier providing a gain of 24 DB.

The converter stage contains a bandpass filter 16 which has a center frequency of 75.42 MHz, a bandwidth of 2 MHz and provides a gain of 5 DB.

The Intermediate Frequency (IF) stage begins with a two-stage amplifier 17 which provides a 60 DB gain. The mixer 19 receives the output signals from the amplifier 17 plus a 75.4 MHz local oscillator signal from the frequency synthesizer 26. The bandpass filter 25 and limiter 24 filters the signal from mixer 19 to remove the effect of other frequency signals.

The final down converter 20 receives the signal from the limiter 24 and further amplifies and heterodynes it down to a frequency of 20 KHz using a mixer 23 and a low pass filter 21. The mixer 23 mixes the signal from the limiter 24 with a 20 kHz signal from the frequency synthesizer 26. Then the signal from the mixer 20 is passed through the 1 MHz low pass filter 21 to the zero crossing detector 22.

The quantized portion of the invention consists of the zero crossing detector 22 and a D type flip flop 24. The zero crossing detector 22 provides a transistor-transistor logic (TTL) digital signal as an input into the D gate of a D type flip flop 24. The other input into the flip flop 24 is a 2 MHz clock signal from the frequency synthesizer 26.

The output of the flip flop 24 is received, along with another 2 MHz clock signal from the frequency synthesizer 26, by the shift register 33 whose output is sampled by a second flip flop 36 which is clocked by a 1 MHz signal from the divide-by-two circuit 35. This second flip flop 36 is used as a latch to control the quadraphase modulator 30.

The output of the quadraphase modulator 30 is amplified by a transmit amplifier 37 into a two Watt transmission signal, and filtered by a bandpass filter 38 which has a bandwidth of 2 MHz and a center frequency selected from the range of 149 to 170 MHz. From the bandpass filter 38, the signal is transmitted out the antenna 40 to either an aircraft or a ground facility.

Figure 4:
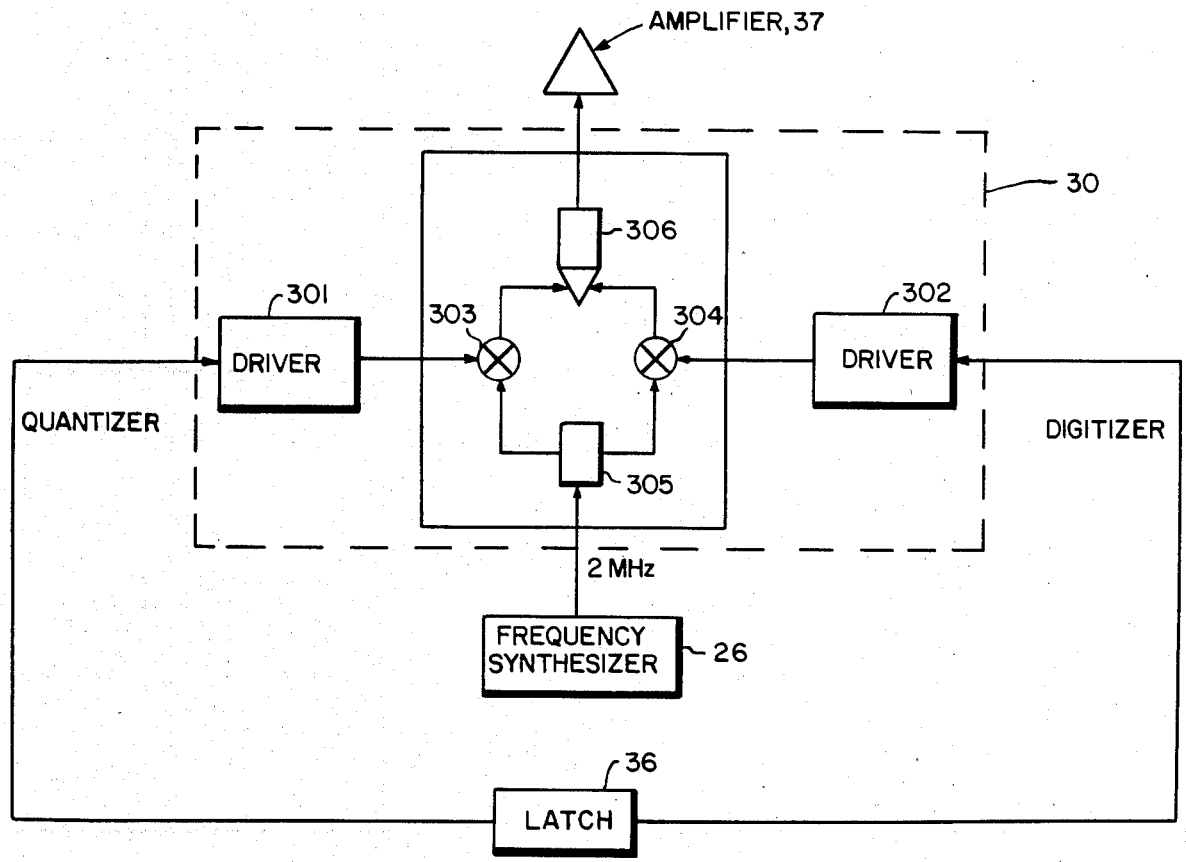
FIG. 4 is a block diagram of the quadraphase modulator.

FIG. 4 is a block diagram of the quadraphase modulator 30 of FIG. 3. As shown in FIG. 4, the quadraphase modulator receives two signals from the latch 36. The first signal from the latch 36 is a relay of the quantizer signal and is received and relayed by driver 301 to multiplier 303. The second signal from the latch 36 is a relay of the digitizer signal and is received and relayed by driver 302 to multiplier 304.

In the quadraphase modulator, a signal splitter 305 receives and relays a 2 MHz clock signal from the frequency synthesizer 26 to multipliers 303 and 304 where it is combined with the signals from drivers 301 and 302. From the multipliers 303 and 304 the signals are combined 306 and sent to the transmit amplifier 37.

Figure 5:
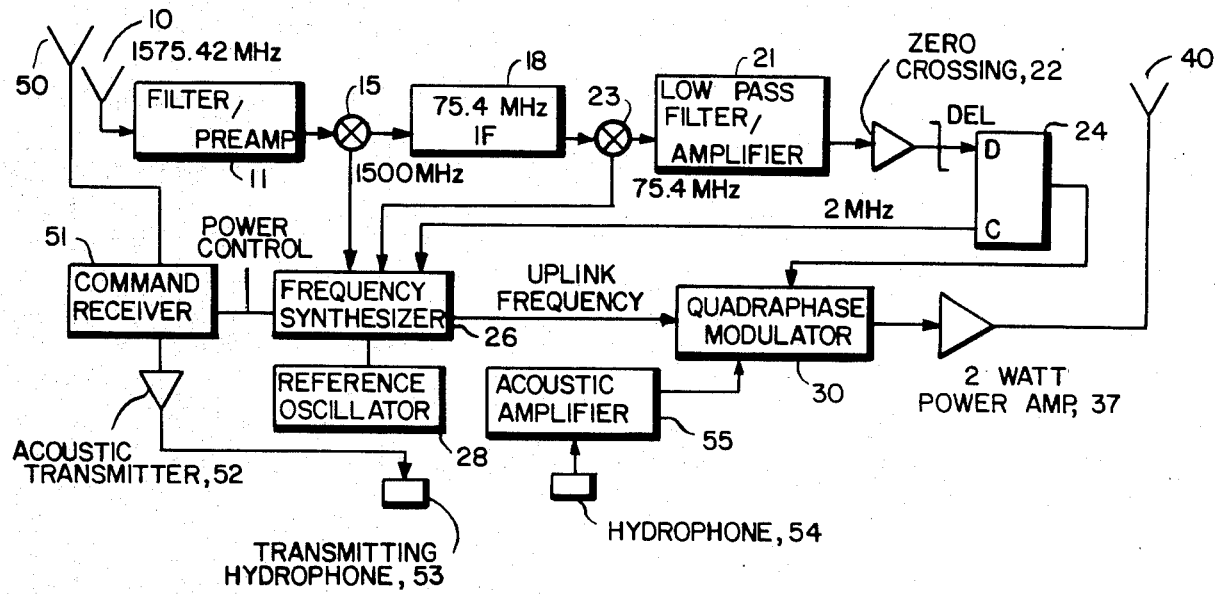
FIG. 5 is a block diagram of the electronics of a sonabuoy.

FIG. 5 is a block diagram of the electronics of the sonobuoy which contains the invention as depicted in FIG. 3. In addition to the element of the transdigitizer (elements 10–40) the sonobuoy electronics contain elements 50 through 55 to generate and receive sonic signals.

As mentioned earlier, to determine the position of the other buoys the acoustic pings generated by each of the buoys are received by the other buoys, and are transmitted to the aircraft. These data are processed in the aircraft to provide the ranges between the buoys, which determine the relative position of the buoys. Because the positions of the GTD buoys are known, the geodetic position of each of the buoys can then be determined.

When a reeentry body strikes the water it will create a large sonic pulse. The time of receipt of this pulse at each of the buoys can be accurately measure d. This information is then used to determine the position of the actual splashes.

The sonobuoy electronics that generate and receive sonic signals consist of the antenna 50, command receiver 51 acoustic transmitter 52, transmit hydrophone 53, receiver hydrophone 54 and an acoustic amplifier 55.

Figure 6:
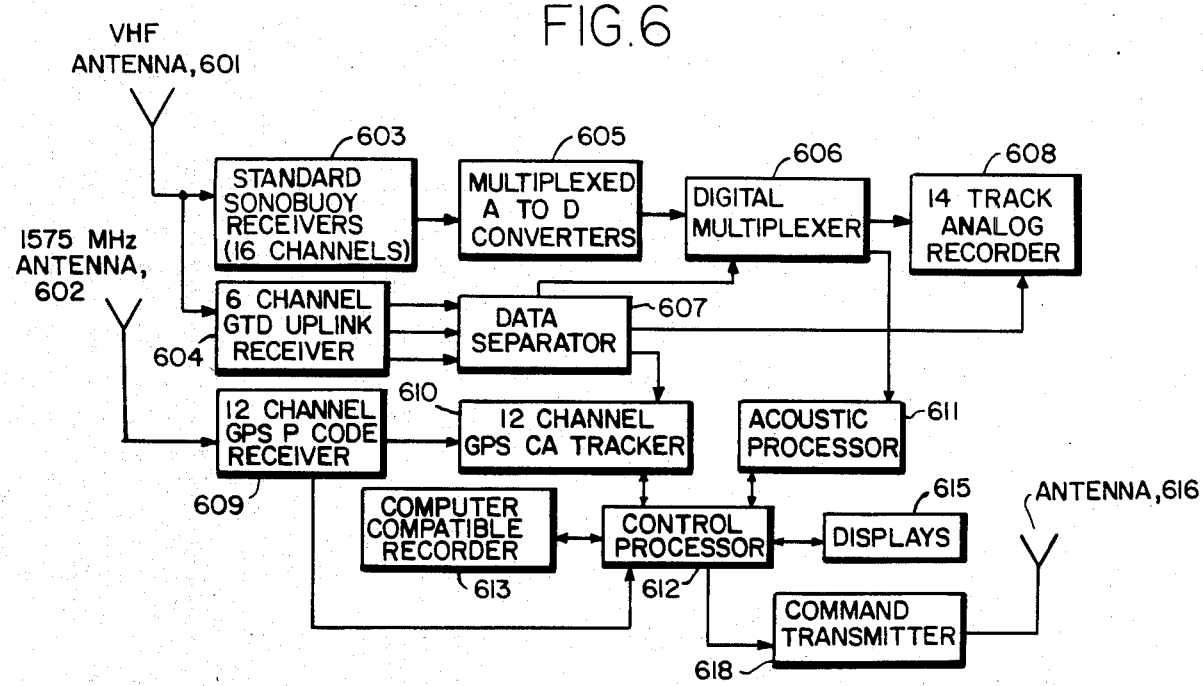
FIG. 6 is a block diagram of the equipment required in the aircraft to use the invention.

FIG. 6 is a block diagram of the equipment required in the aircraft to support operation of this system. The current plan is to house the equipment in a modified 707 aircraft with other range equipment. The aircraft will be equipped not only with the electronics shown in the diagram but also with the facilities to carry and launch sonobuoys. The aircraft will also be equipped with special antennas 601 and 602 to receive signals from the buoys and to provide for reception of signals direct from the GPS satellite. This latter antenna 602 will be mounted on top of the fuselage while the other antennas will be mounted on the bottom of the aircraft.

The signals received from the buoys by antenna 601 are fed to two receiver groups. The first is a standard ASW receiver 603 that is used for receiving the signals from all buoys except the GTD buoys, whose signals are received by receiver group 604. This receiver 603 provides an independent output for the signal from each buoy. These audio frequency signals are digitized by a multiplexed analog to digital converter subsystem 605. These data are fed into multiplexer 606 where they are combined with the digitized acoustic signals transmitted by the GTD buoys.

The transmission from the GTD buoys are processed by a specially designed six channel receiver 604. This receiver filters and amplifies the signals from the selected buoy and separates the acoustic data from the GPS data. The uplink carrier is also recovered, and its frequency measured. Both the GPS and acoustic data are recorded utilizing a standard 14 track analog instrumentation recorder 608.

The GPS data are also fed to a 12 channel Digital Tracker system 610. Twelve channels are required to enable the simultaneous processing of buoys. The Digital Tracker assembly not only tracks the signals and recovers the pseudorange and pseudorange rate but also performs the necessary computation to determine the position of each GTD buoy.

A second bank of Digital Trackers 609 receives signals directly from the satellites. These trackers operate using the P (precision) code and track both the L1 (1557.42 MHz) and the L2 (1227.6 MHz) transmission from the satellites. The principal function of this subsystem is to determine the effect refraction has on the L1 transmission from each satellite. This is performed by processing the L1 and L2 pseudorange and range-rate signals from each spacecraft to derive an estimate of the refraction effect. The refraction data are then used to correct the L1 signals received at the GTD buoys. Studies have indicated that at the maximum range separation of the aircraft from the buoy will be essentially identical, allowing this technique to be used. It would be both difficult and expensive to receive both signals at the sonobuoys. This is particularly true since the L2 signal is modulate only by the P code which requires ten times the uplink bandwidth and power for relaying the signal to the aircraft that the CA (Clear/Acquisition) signals require. In addition to providing the refraction data, the receiver will also provide the aircraft's position which will be used for controlling the sonobuoy deployment.

The acoustic processor 611 measures the acoustic propagation time between the various buoys in the array. This information is used to compute the relative position of the buoys. These data as well as the GTD position data are fed to the control processor 612 which combines this information to provide the geodetic position of the buoys. The acoustic processor also processes the splash data from the reentry bodies to determine the relative position of the splash with respect to the buoy array. Status display 615 as well as a command transmitter 618 which controls the GTD buoys are provided for the use of the system operator.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A transdigitizer for receiving, downconverting and relaying signals from a satellite to a receiving station, said transdigitizer comprising:

a first antenna receiving and relaying said signals from said satellite;

a radio frequency means receiving said signals from said first antenna, said radio frequency means filtering and amplifying said signal, said radio frequency means outputting a filtered signal;

a converter means receiving and converting said filtered signal from said radio frequency means into an intermediate frequency signal;

an intermediate frequency means receiving, filtering and amplifying said intermediate frequency signal from said converted means, said intermediate frequency means outputting a filtered intermediate frequency signal;

a downconverter means receiving and downconverting said intermediate frequency signal into a base band frequency signal;

transmitter means receiving said base band frequency signal from said downconverter means and transmitting a transmit signal to said receiving station; and a frequency control means coordinating said receiving, downconverting and relaying of signals by said transdigitizer by sending: a first clocking signal to said converter means, a second clocking signal to said intermediate frequency means, a third clocking signal to said downconverter means, and fourth and fifth clocking signals to said transmitter means.

2. A transdigitizer as defined in claim 1 wherein said radio frequency means comprises:

a first bandpass filter having a center frequency equaling the frequency of said signal from said satellite, said first bandpass filter receiving and filtering said signals from said first antenna and producing an output signal;

a preamplifier receiving and amplifying said output signal from said first bandpass filter, said preamplifier outputting said filtered signal from said radio frequency means.

3. A transdigitizer as defined in claim 2 wherein said converter means comprises:
- a first mixer producing a first mixed signal by receiving and mixing said filtered signal from said radio frequency means with said first clocking signal from said frequency control means; and
- a second bandpass filter having a center frequency equaling the frequency of said intermediate frequency signal, said bandpass filter producing said intermediate frequency signal by receiving and filtering said first mixed signal from said first mixer.

4. A transdigitizer as defined in claim 3 wherein said intermediate frequency means comprises:
- a first amplifier producing an output signal by receiving and amplifying said intermediate frequency signal from said converter means;
- a second mixer producing a second mixed signal by receiving and mixing said output signal from said first amplifier with said second clocking signal from said frequency control means;
- a third bandpass filter producing a filtered second mixed signal by receiving and filtering said second mixed signal from said second mixer; and
- a limiter producing said filtered intermediate signal by limiting said filtered second mixed signal from said third bandpass filter.

5. A transdigitizer as defined in claim 4 wherein said downconverter means comprises:
- a third mixer producing a third mixed signal by receiving and mixing said filtered intermediate signal from said intermediate frequency means with said third clocking signal from said frequency control means; and
- a low pass filter having a center frequency equaling the frequency of said base band frequency signal, said low pass filter producing said base band frequency signal by receiving and filtering said third mixed signal from said third mixer.

6. A transdigitizer as defined in claim 5 wherein said transmitter means comprises:
- a zero crossing detector producing an output signal by receiving and processing said base band frequency signal from said downconverter means;
- a flip-flop receiving said output signal from said zero crossing detector and said fourth clocking signal from said frequency control means and producing an output signal;
- a shift register receiving said output signal from said flip flop and said fourth clocking signal from said frequency control means and producing a first and second output signal;
- a divide-by-two unit producing an output signal by processing said fourth clocking signal from said frequency control means;
- a latch outputting a quantizer signal and a digitizer signal by processing said first and second output signals from said shift register with said output signal from said divide-by-two unit;
- a quadraphase modulator producing an output signal by processing said digitizer signal and said quantizer signal from said latch with said fifth clocking signal from said frequency control means;
- a transmit amplifier producing an output signal by receiving and amplifying said output signal from said quadraphase modulator;
- a fourth bandpass filter producing said transmit signal by filtering said output signal from said transmit amplifier; and
- a transmit antenna receiving said transmit signal from said fourth bandpass filter and transmitting said transmit signal to said receiving station.

* * * * *